US010389530B2

(12) United States Patent
Marinet et al.

(10) Patent No.: US 10,389,530 B2
(45) Date of Patent: Aug. 20, 2019

(54) SECURE METHOD FOR PROCESSING CONTENT STORED WITHIN A COMPONENT, AND CORRESPONDING COMPONENT

(71) Applicant: STMicroelectronics (Rousset) SAS, Rousset (FR)

(72) Inventors: Fabrice Marinet, Chateauneuf le Rouge (FR); Mathieu Lisart, Aix en Provence (FR)

(73) Assignee: STMICROELECTRONICS (ROUSSET) SAS, Rousset (FR)

( * ) Notice: Subject to any disclaimer, the term of this patent is extended or adjusted under 35 U.S.C. 154(b) by 41 days.

(21) Appl. No.: 15/862,962

(22) Filed: Jan. 5, 2018

(65) Prior Publication Data
US 2018/0131508 A1 May 10, 2018

Related U.S. Application Data

(63) Continuation of application No. 15/056,844, filed on Feb. 29, 2016, now Pat. No. 9,900,151, which is a (Continued)

(30) Foreign Application Priority Data

Nov. 12, 2009 (FR) .................................... 09 57958

(51) Int. Cl.
*H04L 9/08* (2006.01)
*G06F 21/78* (2013.01)
(Continued)

(52) U.S. Cl.
CPC ............ *H04L 9/088* (2013.01); *G06F 3/0623* (2013.01); *G06F 3/0644* (2013.01); (Continued)

(58) Field of Classification Search
CPC ...... G06F 12/1408; G06F 21/62; G06F 21/77; G06F 21/78; G06F 2212/402; G06F 3/0688; G06F 21/72; G06F 12/00; H04L 9/088
See application file for complete search history.

(56) References Cited

U.S. PATENT DOCUMENTS 6,457,126 B1 9/2002 Nakamura et al.
6,986,052 B1 1/2006 Mittal
(Continued)

FOREIGN PATENT DOCUMENTS

EP 0961193 A2 12/1999
EP 1429224 A1 6/2004

OTHER PUBLICATIONS

Cesena, E., et al., "Secure storage using a sealing proxy," In Proceedings of the 1st European Workshop on System Security (EUROSEC '08). ACM, DOI=http://dx.doi.org/1 0.1145/1355284. 1355290, pp. 27-34, Mar. 2008.
(Continued)

*Primary Examiner* — Saleh Najjar
*Assistant Examiner* — Feliciano S Mejia
(74) *Attorney, Agent, or Firm* — Slater Matsil, LLP

(57) ABSTRACT

A method for processing content stored on a component is disclosed. A first partition of a first memory is encrypted with a first encryption key and a second partition of the first memory is encrypted with a second encryption key. The second encryption key is different from the first encryption key. The first encryption key is stored in a storage register of the component and the second encryption key is stored in a first location of a non-volatile memory. A memory address of the first location is stored in the first partition of the first memory.

20 Claims, 14 Drawing Sheets

Related U.S. Application Data continuation of application No. 12/942,557, filed on Nov. 9, 2010, now Pat. No. 9,323,941.

(51) Int. Cl.
  *G06F 11/14* (2006.01)
  *G06F 21/62* (2013.01)
  *G06F 21/77* (2013.01)
  *G06F 3/06* (2006.01)
  *G06F 12/14* (2006.01)

(52) U.S. Cl.
  CPC ........ *G06F 3/0688* (2013.01); *G06F 11/1458* (2013.01); *G06F 12/1408* (2013.01); *G06F 21/62* (2013.01); *G06F 21/77* (2013.01); *G06F 21/78* (2013.01); *G06F 2212/402* (2013.01)

(56) References Cited

U.S. PATENT DOCUMENTS

| | | | |
|---|---|---|---|
| 7,005,733 B2 | 2/2006 | Kommerling et al. | |
| 7,117,372 B1 | 10/2006 | Trimberger et al. | |
| 7,237,121 B2 | 6/2007 | Cammack et al. | |
| 7,401,361 B2 | 7/2008 | Freeman et al. | |
| 7,441,068 B2 | 10/2008 | Pua et al. | |
| 7,822,979 B2* | 10/2010 | Mittal | G06F 12/1441 713/164 |
| 8,090,919 B2* | 1/2012 | Sahita | G06F 12/1491 711/163 |
| 8,145,900 B2 | 3/2012 | Launchbury et al. | |
| 8,341,403 B2 | 12/2012 | Yoon | |
| 8,356,361 B2* | 1/2013 | Werner | G06F 12/1433 709/225 |
| 8,738,932 B2* | 5/2014 | Lee | G06F 21/72 713/190 |
| 9,436,846 B2* | 9/2016 | Hartley | G06F 21/575 |
| 2003/0163717 A1 | 8/2003 | Yoshimoto et al. | |
| 2005/0076226 A1 | 4/2005 | Boivie et al. | |
| 2005/0086419 A1* | 4/2005 | Neble | G06F 21/10 711/100 |
| 2006/0230439 A1 | 10/2006 | Smith et al. | |
| 2007/0168292 A1 | 7/2007 | Jogand-Coulomb et al. | |
| 2009/0046858 A1 | 2/2009 | Iyer et al. | |

OTHER PUBLICATIONS

Kato, T. et al., "A secure flash card solution for remote access for mobile workforce," in IEEE Transactions on Consumer Electronics, vol. 49, No. 3, pp. 561-566, Aug. 2003, doi: 10.1109/TCE.2003.1233772, http:ieeexplore.ieee.org/stam p/stam p. jsp?tp=&arnumber=1233772&isnumber=27648.

Republique Francais, Institut National De La Propriete Industrielle, Rapport De Recherche Preliminaire (Preliminary Search Report), dated Jul. 1, 2010 in France Patent Application No. FR 0957958 (2 pages).

Yang, J, et al., "Fast secure processor for inhibiting software piracy and tampering," IEEE 36th Annual Proceedings, International Symposium on Microarchitecture, MICR0-36., 2003, pp. 351-360, doi:10.1109/MICR0.2003.1253209, http://ieeexplore.ieee.org/stamp/stamp.jsp?p=&arnumber=1253209&isnumber=28039.

* cited by examiner

SECURE METHOD FOR PROCESSING CONTENT STORED WITHIN A COMPONENT, AND CORRESPONDING COMPONENT

CROSS-REFERENCE TO RELATED APPLICATIONS

This application is a continuation of U.S. patent application Ser. No. 15/056,844, entitled "Secure Method for Processing Content Stored Within a Component, and Corresponding Component," filed Feb. 29, 2016, which application is a continuation of U.S. application Ser. No. 12/942,557, which was filed on Nov. 9, 2010, now U.S. Pat. No. 9,323,941, which application claims the benefit of French Patent Application 0957958, which was filed Nov. 12, 2009, which applications are incorporated herein by reference.

TECHNICAL FIELD

The invention relates to the protection of contents stored within a component, notably but not exclusively in the field of smart cards.

BACKGROUND

Currently, in order to clone or emulate a secure product such as for example an integrated circuit of a smart card, it is possible, with an average level of time, experience, number of samples and appropriate equipment, to carry out an invasive physical attack which is aimed at physically reading the encrypted content in a memory, for example a read-only memory, so as to extract therefrom a protected value representative of a confidential code for example, and to carry out a reverse engineering operation on the encryption/decryption logic circuit embedded in a logic set commonly called "glue logic" by those skilled in the art.

It then becomes possible to obtain the confidential code in clear.

SUMMARY

In one aspect, the present invention provides for a method for processing content stored within a component, the component comprising a first memory and a non-volatile memory. The content of a first portion of the first memory is modified with a first entity and the content of a second portion of the first memory is modified with a second entity. The method comprises storing said first entity secretly in the component. The method further comprises storing an item of entity information representative of said second entity in said non-volatile memory in a location designated by a first indication contained in said first portion of the first memory.

In another aspect, the present invention provides for a component comprising a first memory including a first portion having a content modified with a first entity and a second portion having a content modified with a second entity. The component further includes storage means configured to store the first entity secretly, and a non-volatile memory storing an item of entity information representative of the second entity in a location designated by a first indication contained in said first portion of the first memory.

BRIEF DESCRIPTION OF THE DRAWINGS

Other advantages and features of the invention will appear on examination of the detailed description of modes of application and embodiments which are in no way limiting and of the appended drawings in which.

DETAILED DESCRIPTION OF ILLUSTRATIVE EMBODIMENTS

Figure 1:
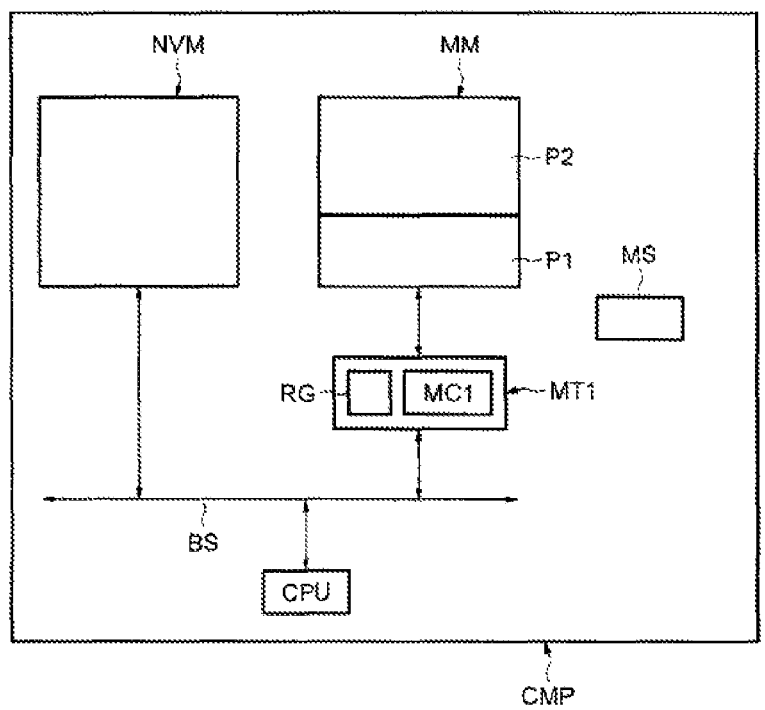
FIG. 1 illustrates schematically an embodiment of a component according to the invention.

Before describing specific embodiments in detail, various embodiments are described generally. This technique described herein can be applied to RAM memories the content of which can be read electrically (for example by means of the potential contrast method), as well as other memories.

According to one mode of application and embodiment, a method and a component are proposed that makes it possible to reinforce the protection of the component against an attacker who would like to clone or emulate such a component.

According to one aspect, a secure method for processing a content stored within a component is proposed; the component comprises a first memory, for example a ROM memory or a RAM memory and a non-volatile memory, for example an electrically programmable and erasable memory (EEPROM memory) or else a FLASH memory; the content of a first portion of the first memory has been modified with a first entity, and the content of a second portion of the first memory has been modified with a second entity.

The term "modified" should be understood here in a very broad sense covering notably an encryption and/or an operation commonly referred to as "scrambling" by those skilled in the art.

Similarly, the concept of "entity" must also be taken in a very broad sense, covering notably an encryption key and/or a scrambling key which will be able to be used respectively with encryption/decryption operations and scrambling/descrambling. An entity may also be formed of bits a portion of which may be used as bits for configuring a configurable logic circuit and of which another portion may form an encryption key that can be used as an input parameter of the encryption/decryption function used by the logic circuit configured by the configuration bits.

In the method according to this aspect, the said first entity, for example a first encryption/decryption key, is stored secretly in the component, and an item of entity information representative of the said second entity, for example a second encryption/decryption key, in the said non-volatile memory in a location designated by a first indication contained in the said first portion of the first memory.

According to one mode of application, an inverse modification process, for example a decryption process, is applied to the modified content of the first portion of the first memory by using the said first entity, then, after the said first indication is obtained with the said inverse modification process, the said second entity, for example the second encryption/decryption key, is obtained from the said item of entity information contained in the non-volatile memory and, an inverse modification process is applied to the modified content of the second portion of the first memory by using the said second entity.

Therefore, according to this aspect, provision is made to store important items of information, for example an encryption key, in a third element, namely a non-volatile memory. And, if for example a confidential code is stored in an encrypted manner in the second portion of the first memory, for example a ROM memory, with the second encryption key which is itself stored in the non-volatile memory, the attacker must make a physical invasive attack on three elements instead of two in the prior art, namely on the first memory, on the non-volatile memory and on the decryption logic.

The protection of the component is consequently strengthened.

Moreover, the protection is also strengthened by the fact that the content of the first memory is encrypted with two different keys, the second key for its part not being contained in this memory but in another memory, namely the non-volatile memory, and its location (the address or the addresses) is designated by an indication encrypted by the first key and contained in the first memory.

Furthermore, this protection against possible attacks is yet more effective when the non-volatile memory is a non-volatile memory that is at least electrically programmable, for example an EPROM memory, and preferably an electrically programmable and erasable memory such as an EEPROM memory or a FLASH memory.

Specifically, an invasive physical attack on a non-volatile memory that is at least electrically programmable, and more particularly an EEPROM memory or a FLASH memory, is extremely difficult and completely different from a physical attack on a ROM memory.

According to one mode of application, the said item of entity information may be the second entity itself. In other words, in this case, the second entity, for example an encryption/decryption key, is stored in clear, that is to say in an unencrypted manner in the non-volatile memory.

As a variant, the said item of entity information may be the second entity modified with the first entity. In other words, the said item of entity information, which is stored in the non-volatile memory, is in this case for example the second key encrypted with the first key. In such a mode of application, which is more robust in the matter of security than the foregoing, after having obtained the said first indication, an inverse modification process is applied to the said modified item of entity information by using the first entity so as to obtain the said second entity.

In other words, if the entities are encryption keys, after the first indication is obtained, that is to say the indication of the location where the key information is stored in the non-volatile memory, the second key stored in an encrypted manner in the non-volatile memory is decrypted with the aid of the first key so as to obtain the second key in clear.

In one mode of application that is yet more secure, it is possible to have the non-volatile memory possess a first portion in which the said item of entity information (that is to say for example the second key in clear or the second encrypted key) and a second portion the content of which has been modified with a third entity, for example a third encryption key, are stored. Then, the third entity modified with the said second entity (for example the third key encrypted with the second key) is stored in the second part of the first memory and after an inverse modification process is applied to the said third modified entity (for example a decryption) by using the second entity (for example the second encryption key), an inverse modification process (for example with a decryption process) is applied to the modified content of the second portion of the non-volatile memory by using the third entity (for example the third encryption key).

Therefore, in this mode of application, the third encryption key which makes it possible to decrypt the second portion of the non-volatile memory, containing for example highly secure data, is not in the non-volatile memory itself, but in the first memory in a form encrypted with the aid of the second key which is also not in the first memory but in the non-volatile memory. Therefore, in this instance a sort of crossed storage is carried out of the keys in the two memories and at least one of the keys (the third encryption key) is itself stored in an encrypted manner with another encryption key.

At least one of the entities may comprise an encryption key and the associated inverse modification process comprises a decryption process.

As a variant, instead of using an actual encryption tool, it is possible to use a scrambling process. In this case, at least one of the entities may comprise a scrambling key and the associated inverse modification process comprises a descrambling process.

Naturally, the two modes of application are not incompatible. Therefore, at least one of the contents may have been both encrypted with an encryption key and scrambled with a scrambling key, and the associated inverse modification process then comprises a decryption process and a descrambling process. The order of these processes is the inverse of the order of the encryption and scrambling processes.

According to another aspect, a component is proposed comprising a first memory comprising a first portion having a content modified with a first modification entity and a second portion having a content modified with a second entity, a storage means configured for storing the first entity secretly, a non-volatile memory storing an item of entity information representative of the second entity in a location designated by a first indication contained in the said first portion of the first memory.

According to one embodiment, the component comprises:

first processing means capable of applying an inverse modification process to the modified content of the first portion of the first memory, second processing means capable of applying an inverse modification process to the content of the second portion of the first memory, control means capable of first activating the first processing means with the first entity, then in order to obtain, after inverse modification processing on the said first indication with the said first entity, the second entity from the said item of entity information contained in a non-volatile memory and in order to activate the second processing means with the second entity.

The said item of entity information may be the second entity or the second entity modified with the first entity.

In the latter case, and according to one embodiment, the component also comprises auxiliary processing means that are structurally identical to the first processing means and capable of applying an inverse modification process to the said item of entity information, and the control means are also capable, after having obtained the said first indication, of activating the auxiliary processing means with the first entity in order to obtain the said second entity.

Although the first and second processing means may be structurally different, in practice, and for reasons of simplicity of production, they are preferably structurally identical.

According to one embodiment allowing in particular a crossed storage of the entities, the non-volatile memory comprises a first portion storing the said item of entity information, and a second portion having a content modified with a third entity, the second portion of the first memory storing the third entity modified with the said second entity; the component also comprises a third processing means capable of applying an inverse modification process to the modified content of the second portion of the non-volatile memory, and the control means are also capable of activating the third processing means with the third entity delivered by the second processing means.

Here again, for reasons of simplicity, the third processing means are usually structurally identical to the first and second processing means, although they may be different.

According to one embodiment, at least one of the entities comprises an encryption key and the associated processing means is configured in order to use a decryption algorithm with key, for example an algorithm of the DES or AES type.

According to another embodiment, at least one of the entities comprises an encryption key and the associated processing means comprises a logic circuit that can be structurally configured with the aid of at least one portion of the encryption key.

Such an embodiment makes it possible in particular to apply the decryption in a clock cycle of a clock signal delivered to a processor unit on board the component.

According to another embodiment, at least one of the entities comprises a scrambling key and the associated processing means comprises an additional circuit configured in order to apply a descrambling operation.

Naturally, as indicated above, at least one of the entities may comprise an encryption key and a scrambling key and in this case the associated processing means comprise both a circuit capable of applying a decryption and an additional circuit capable of applying a descrambling operation.

According to an embodiment which is particularly robust from the security point of view, the non-volatile memory is a memory of the electrically programmable and erasable type or a memory of the FLASH type.

According to another aspect, a smart card is proposed containing a component as defined above.

According to FIG. 1, the reference CMP indicates an electronic component made for example in the form of an integrated circuit, and comprising a first memory MM, for example a read-only memory (ROM memory) or else a random-access memory (RAM memory).

This first memory comprises a first portion P1 and a second portion P2.

The component also comprises a non-volatile memory NVM, for example an EEPROM memory.

Also provided is a storage means MS, for example registers, intended, as will be seen below, for storing secretly, that is to say for example permanently, a first entity such as a first encryption/decryption key.

The component also comprises first processing means MT1, to which we will return in greater detail below on the structure and functionality, coupled between the memory MM and a bus BS to which is also connected a processor unit, such as a microprocessor or a microcontroller, CPU. The CPU unit may incorporate a control software module capable of activating the processing means MT1.

The non-volatile memory NVM is also connected to the bus BS so that all of these elements CPU, NVM, MM can exchange information.

In general, the content of the first portion P1 of the memory MM has been modified with a first entity and the content of the second portion P2 of the first memory has been modified with a second entity.

In the embodiment and mode of application that will now be described, it is assumed, for the purposes of simplification, that the modification results from an encryption, the first entity then being an encryption key K1 and the second entity an encryption key K2. In this case, the processing means MT1 are capable of applying a decryption process and comprise a register RG designed to store the decryption key (which is also the encryption key) and computing means MC1 capable for example of using a decryption algorithm, for example of the AES (Advanced Encryption Standard) or DES (Data Encryption Standard) type.

Figure 2:
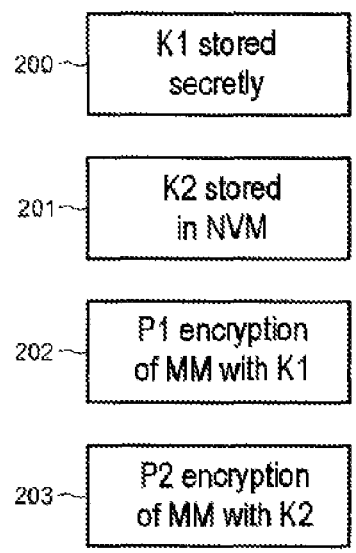
FIGS. 2 to 6 illustrate schematically a mode of application of a method according to the invention.

Referring now to FIG. 2, it can be seen that the key K1 is stored secretly (step 200) in the storage means MS. It is for example a permanent storage in a protected memory means, such as one or more registers for example. The value of the key K1 may also for example be the secret value for resetting a protected register.

Moreover, the key K2 has been stored in a location in the non-volatile memory NVM (step 201).

And, as indicated above, the content of the first portion P1 of the memory MM has been encrypted with the key K1 (step 202) while the content of the second portion P2 of the memory MM has been encrypted with the key K2 (step 203).

The second portion P2 of the memory MM may comprise protected user data, for example a confidential code.

The first portion P1 of the memory MM for its part comprises booting instructions so as to allow the device to start when the component is powered up.

Figure 3:
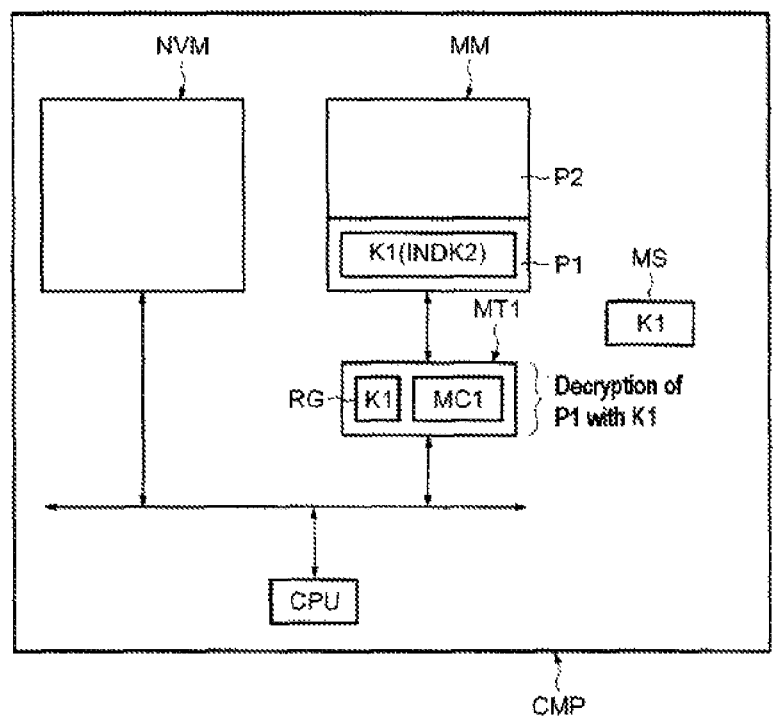

Therefore, as illustrated in FIG. 3, when the component is powered up, the decryption means MC1 use the key K1, that has been shown here in the register RG, and begin to decrypt the content of the portion P1 of the memory MM with the key K1.

In this portion P1 of the memory MM has been stored, encrypted by the key K1, an indication INDK2 designating the location in the non-volatile memory NVM in which the second key K2 is stored.

In general, this location may be an address or if necessary several addresses, which may or may not be contiguous, of the memory NVM. Specifically, the key K2 may be stored at a precise address or at several different addresses in the event, for example, that this key consists of several bytes.

Figure 4:
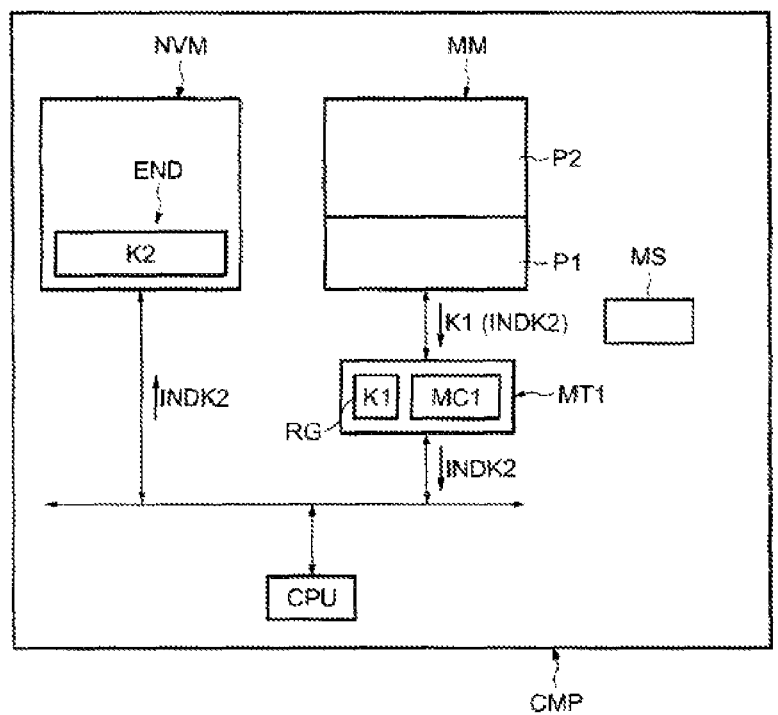

When the encrypted indication K1 (INDK2) is decrypted by the first processing means MT1, this indication INDK2 allows the processor unit CPU (FIG. 4) to address the non-volatile memory NVM at the address designated by this indication INDK2.

As a result, the key K2 stored in the location END designated by the address INKD2 is extracted from the memory NVM (FIG. 4) in order to be stored finally in the register RG of the first processing means MT1.

Figure 5:
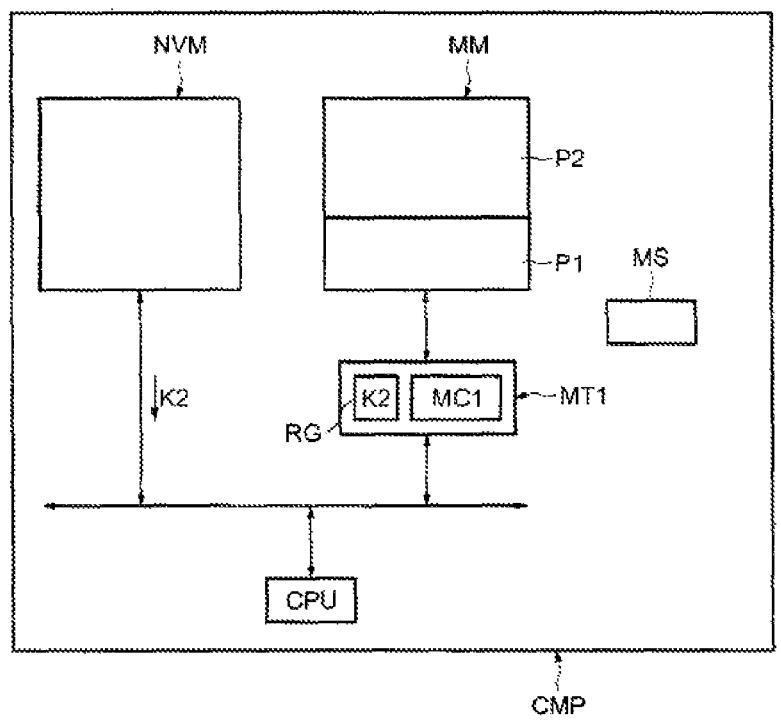

Specifically, in FIG. 5, for purposes of simplification, all that is shown is a single register RG. In practice, it is possible to arrange to store the key K2 in a temporary register so that the processor CPU can if necessary continue to extract data from the first portion P1 of the memory via the means MT1 using the key K1 during the transfer of the key K2. And it is simply only when all the bytes of the key K2 have been stored in the temporary register that the key K2 can replace the key K1 in the register RG so as to allow the processing means to switch to the key K2.

Figure 6:
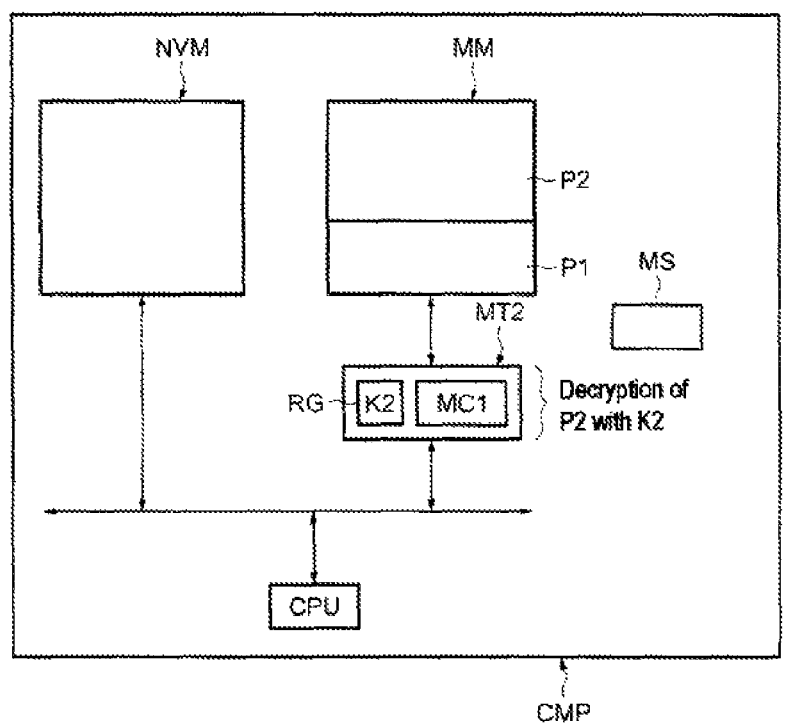

This is illustrated in FIG. 6 and the processing means then become second processing means MT2 decrypting the content of the second portion P2 of the memory MM with the key K2.

Although it is possible to use processing means MT2 that differ from the processing means MT1 which have been used with the key K1, in practice, and for reasons of simplification, the second processing means MT2 are structurally identical to the first processing means MT1. In other words, the decryption means MC1 use the same algorithm but with a different key.

In the mode of application that has just been described, the key K2 is stored in clear in the memory NVM.

Figure 7:
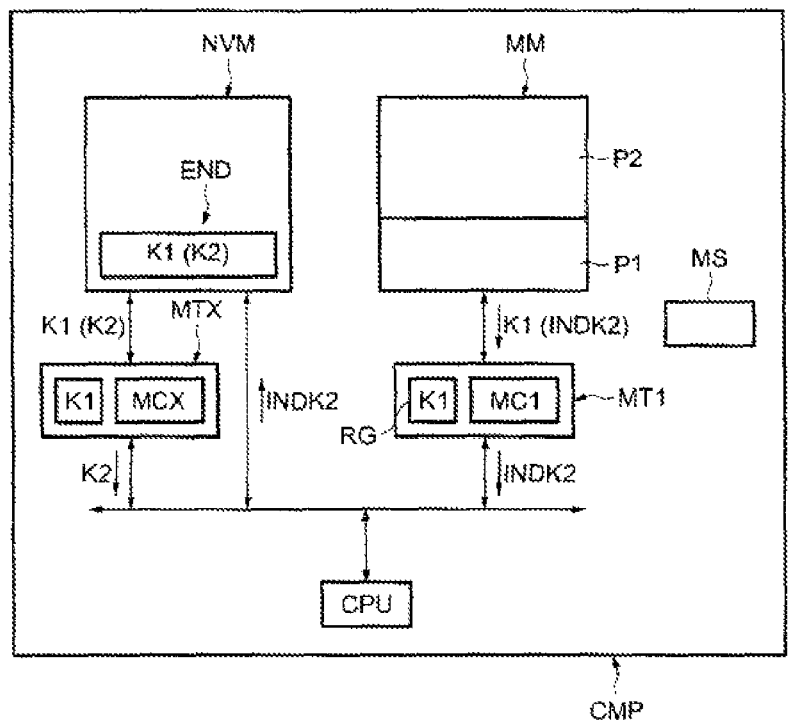
FIG. 7 illustrates schematically another embodiment and mode of application of the invention.

It would also be possible to envisage, as illustrated schematically in FIG. 7, that this key K2 is stored in a form encrypted by the key K1 in the location END.

In this case, auxiliary processing means MTX are for example provided that are structurally identical to the first processing means MT1 and in this respect comprise auxiliary decryption means MCX associated with a register containing the key K1.

Therefore, when the memory NVM is addressed by the indication INDK2 which has been decrypted by the first processing means MT1, the encrypted value K1 (K2) of the key K2 is extracted from the memory NVM and decrypted by the auxiliary processing means MTX using the key K1 so as to obtain in clear the key K2 which, as explained above, will finally be stored in the register RG in order to allow the decryption of the portion P2 of the memory MM.

Such a mode of application and embodiment is more secure since the key K2 is stored encrypted in the memory NVM.

In the embodiment that has been described, the processing means MT1 would comprise decryption means capable of using a decryption algorithm, for example of the AES or DES type. Such means are more robust with respect to security but they require several clock cycles of the clock signal running the CPU unit to decrypt the data.

Figure 8:
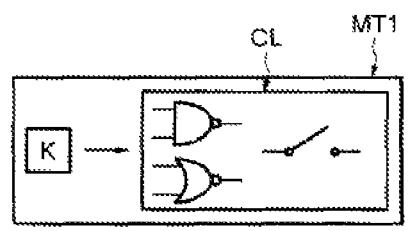
FIGS. 8 to 10 illustrate in greater detail but still schematically examples of structures of processing means of a component according to the invention.

Therefore, in certain applications, it can be envisaged to use, as illustrated in FIG. 8, processing means MT1 also capable of carrying out a decryption based on an encryption/decryption key K, but using, instead of a decryption algorithm, a logic circuit CL consisting of logic gates and switches. Such a circuit CL is consequently able to be configured, that is to say that its logic structure can be modified, based on the bits of the encryption/decryption key K. The bits of the key K are then commonly called configuration bits.

Such processing means on this occasion make it possible to decrypt an item of data in one cycle of the clock signal.

As a variant, the circuit CL may be configured so as to use an encryption/decryption logic function using a specific key as an input parameter. In this case, a portion of the bits of the key K can be used as configuration bits of the circuit CL and the remaining bits of the key K can form the said specific key.

Figure 9:
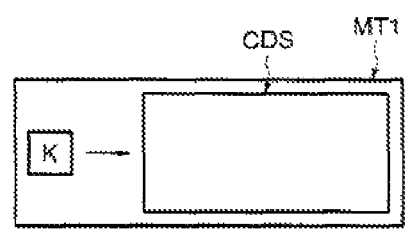

What has just been described for the encryption/decryption can also apply for scrambling and a descrambling operation. In this case, the entities are no longer encryption/decryption keys but scrambling keys. Note here that a scrambling operation of a digital word consists in changing the order of the bits of this word in the memory. In such an application, the processing means MT1 comprise on this occasion means CDS (FIG. 9) capable of carrying out a descrambling operation by using the scrambling key K.

Figure 10:
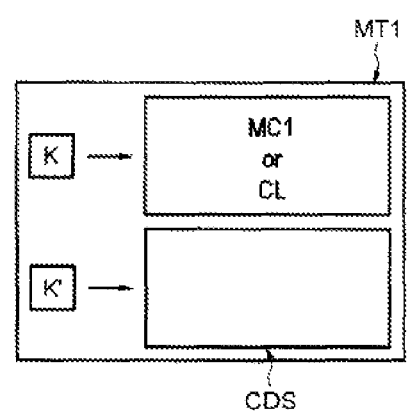

It is also possible to combine a scrambling operation and an encryption operation when contents are stored in the various memories. Consequently, when these stored contents are read, a descrambling operation and a decryption operation are carried out. The processing means MT1 then comprise, as illustrated in FIG. 10, decryption means, for example such as those referenced MC1 or such as those referenced CL, using an encryption/decryption key K and means capable of carrying out a descrambling operation CDS, such as those illustrated in FIG. 9, then using a scrambling key K'.

Figure 11:
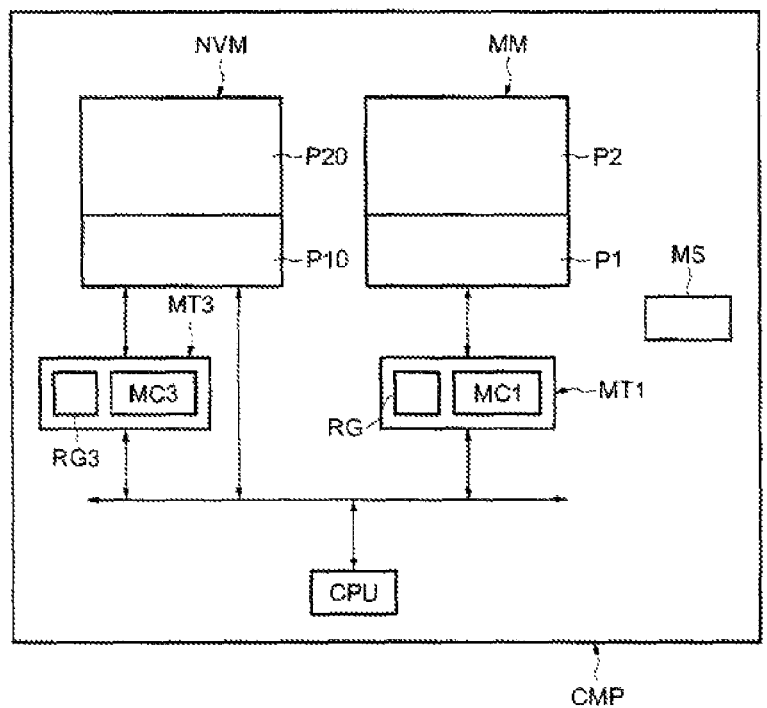
FIG. 11 illustrates schematically another embodiment of a component according to the invention.

FIG. 11 illustrates another possible embodiment of a component according to the invention.

Compared with the structure illustrated in FIG. 1, the component in this instance also comprises third processing means MT3 which are for example means capable of applying a decryption with the aid of an encryption/decryption key stored in the register RG3. These means MT3 may therefore be structurally identical to the processing means MT1.

Figure 12:
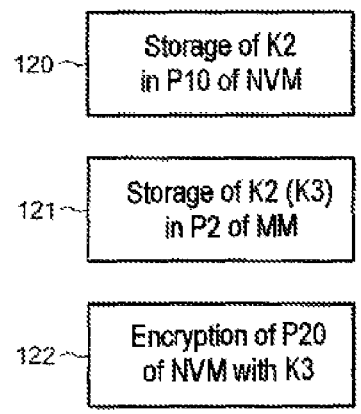
FIGS. 12 to 15 illustrate schematically another mode of application of a method according to the invention.

In this embodiment, the non-volatile memory NVM comprises a first portion P10 in which the key K2 is stored (step 120, FIG. 12). In this exemplary embodiment, the key K2 is stored in clear but it could equally be stored encrypted with the key K1 as indicated above.

Moreover, the memory NVM comprises a second portion P20 the content of which has been encrypted with a third encryption key K3 (step 122). This second portion P20 may therefore also comprise security data for the user, such as for example again a confidential code.

The encryption key K3 is stored (step 121, FIG. 12) in a form encrypted with the key K2 in the second portion P2 of the memory MM.

Figure 13:
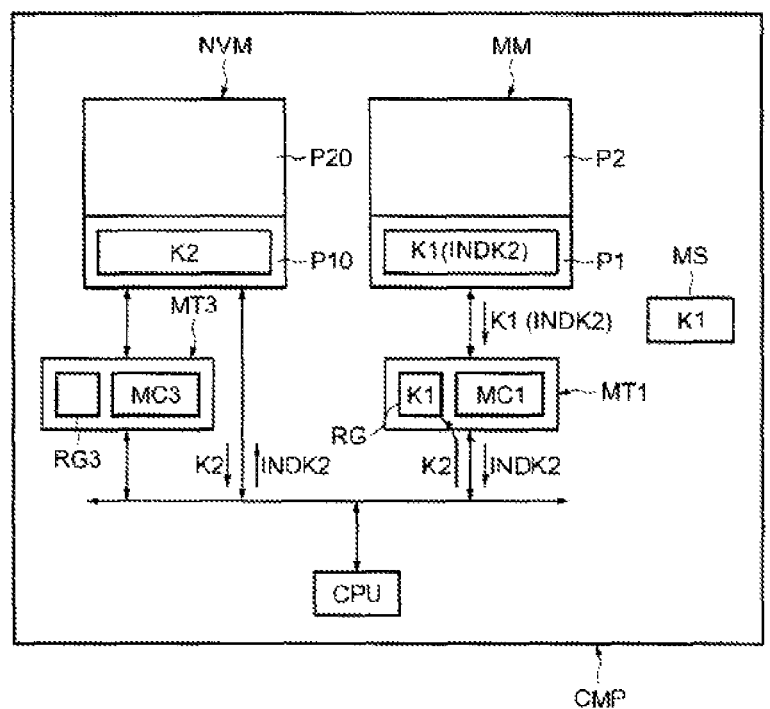

Therefore, in this mode of application, as illustrated in FIG. 13, when the component is powered up, the processing means MT1 begin to decrypt the content of the portion P1 of the memory MM with the key K1. Then, when the encrypted indication K1 (INDK2) is decrypted, this indication INDK2 allows the CPU unit to address the first portion P10 of the memory NVM so as to be able to extract therefrom the second encryption key K2 which will be finally stored in the register RG of the processing means MT1.

Then the processing means MT1 continue to decrypt the second portion P2 of the memory MM with the key K2.

Figure 14:
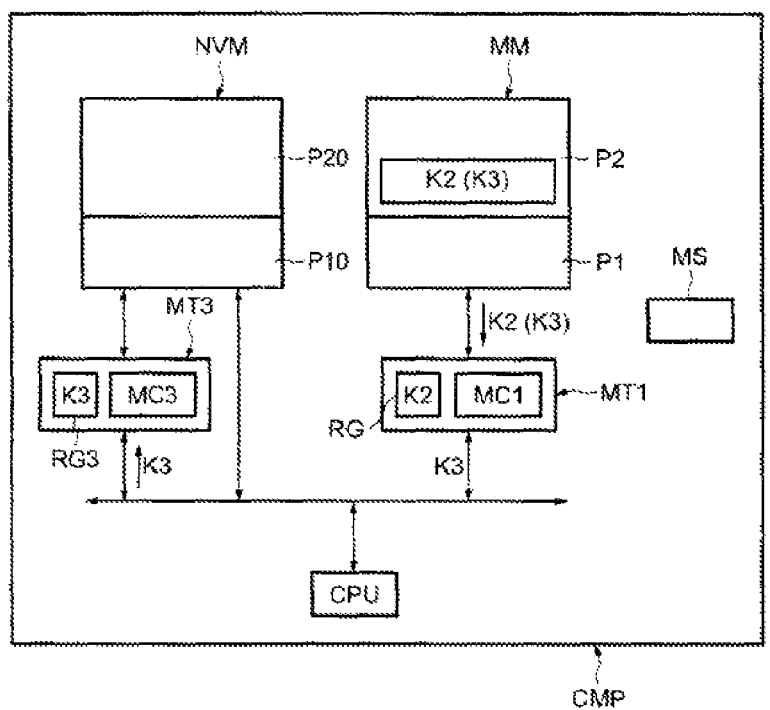
Figure 15:
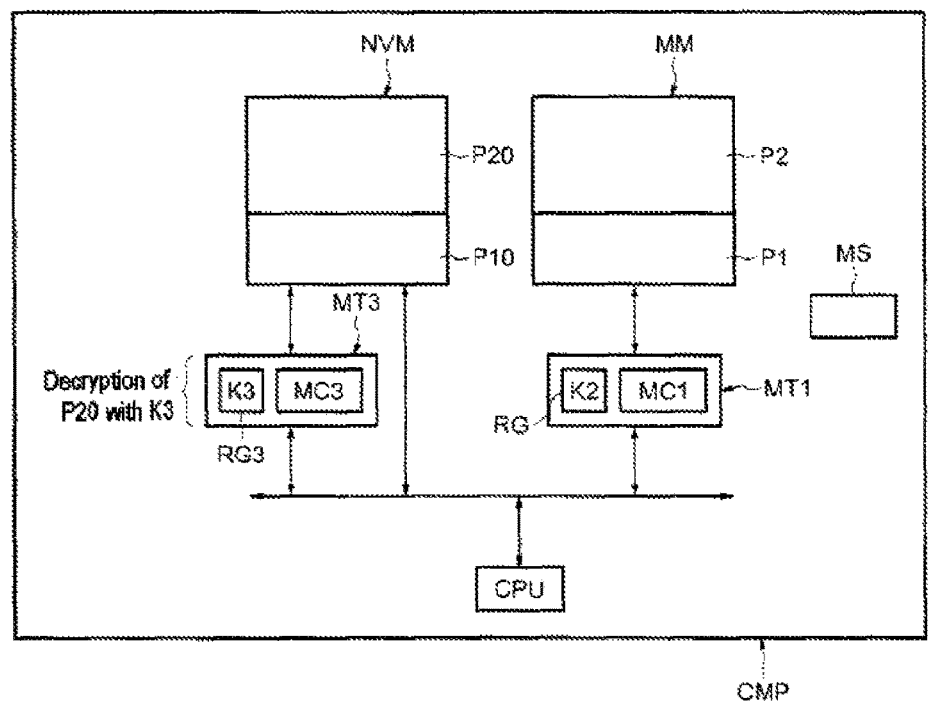

The key K3 encrypted with the key K2 is then decrypted by the processing means MT1 (FIG. 14) and the key K3 is then supplied to the processing means MT3, which, as illustrated in FIG. 15, will make it possible to decrypt the content of the portion P20 of the memory NVM with this key K3.

It can therefore be seen here that there is an embodiment and a mode of application that is highly secure because it uses in particular a crossed storage of the keys in the two memories MM and NVM with, what is more, certain of these keys encrypted.

Moreover, when the memory NVM is an EEPROM memory or a FLASH memory, it becomes extremely difficult to attack physically.

Figure 16:
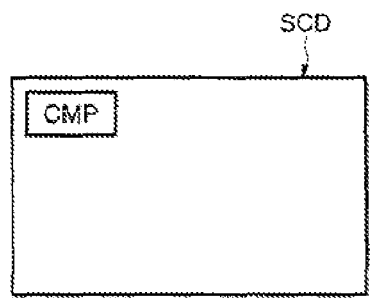
FIG. 16 illustrates schematically an embodiment of a smart card according to the invention.

Such a security component CMP may for example be incorporated into a smart card SCD as illustrated schematically in FIG. 16.

What is claimed is:

1. A method for processing content stored on a component, the method comprising:

modifying a first partition of a first memory with a first key, the first partition comprising booting instructions to be executed in response to the component being powered up;

modifying a second partition of the first memory with a second key, the second partition being different from the first partition, the second key being different from the first key, the second partition comprising protected user data;

storing the first key in a protected storage register of the component;

storing the second key in a first location of a non-volatile memory, the non-volatile memory being different from the first memory; and storing a memory address of the first location of the non-volatile memory in the first partition of the first memory.

2. The method of claim 1, wherein a value of the first key is configured to reset the protected storage register.

3. The method of claim 1, wherein the first key and the second key comprise a first encryption key and a second encryption key.

4. The method of claim 3, wherein modifying the first partition of the first memory with the first key comprises:
encrypting the booting instructions with the first encryption key; and
storing the booting instructions in encrypted form in the first partition of the first memory.

5. The method of claim 3, wherein modifying the second partition of the first memory with the second key comprises:
encrypting the protected user data with the second encryption key; and
storing the protected user data in encrypted form in the second partition of the first memory.

6. The method of claim 1, wherein the first key and the second key comprise a first scrambling key and a second scrambling key.

7. The method of claim 1, wherein storing the second key in the first location of the non-volatile memory comprises:
modifying the second key with the first key; and
storing the second key in modified form in the first location of the non-volatile memory.

8. The method of claim 7, further comprising:
obtaining the memory address of the first location of the non-volatile memory in the first partition of the first memory using the first key;
after the memory address of the first location is obtained, retrieving the second key from the first location of the non-volatile memory based on the memory address of the first location; and
after the second key from the first location is retrieved, obtaining the protected user data stored in the second partition of the first memory using the second key.

9. The method of claim 8, wherein retrieving the second key from the first location of the non-volatile memory comprises:
obtaining the second key in modified form from the first location of the non-volatile memory; and
after the second key in modified form is obtained, retrieving the second key in clear form from the second key in modified form using the first key.

10. The method of claim 1, wherein storing the memory address of the first location of the non-volatile memory in the first partition of the first memory comprises:
modifying the memory address of the first location of the non-volatile memory with the first key; and storing the memory address of the first location of the non-volatile memory in modified form in the first partition of the first memory.

11. The method of claim 1, wherein the non-volatile memory comprises a first partition and a second partition, wherein the first partition of the non-volatile memory includes the first location, wherein the second partition of the non-volatile memory is modified with a third key different from the first key and the second key, and wherein the third key is modified with the second key and stored in the second partition of the first memory in modified form.

12. The method of claim 11, further comprising:
obtaining the memory address of the first location of the non-volatile memory from the first partition of the first memory using the first key;
after the memory address of the first location of the non-volatile memory is obtained, retrieving the second key from the first location of the non-volatile memory;
after retrieving the second key from the first location of the non-volatile memory, obtaining the third key in clear form from the second partition of the first memory using the second key; and
after obtaining the third key in clear form, obtaining content of the second partition of the non-volatile memory in clear form using the third key.

13. A component, comprising:
a first memory, comprising:
a first partition encrypted with a first key, the first partition comprising booting instructions to be executed in response to the component being powered up; and
a second partition different from the first partition and encrypted with a second key, the second key different from the first key, the second partition comprising protected user data;
a protected storage register storing the first key, wherein a value of the first key is configured to reset the protected storage register; and
a non-volatile memory comprising the second key stored in encrypted form in a first location of the non-volatile memory, wherein a memory address of the first location of the non-volatile memory is stored in the first partition of the first memory.

14. The component of claim 13, wherein the second key is encrypted with the first key.

15. The component of claim 13, further comprising:
a first processor configured to decrypt the first partition of the first memory using the first key;
a second processor configured to decrypt the second partition of the first memory using the second key; and
a controller configured to:
retrieve the first key from the protected storage register;
activate the first processor with the first key;
obtain the memory address of the first location of the non-volatile memory from the first partition of the first memory via the first processor;
obtain the second key in clear form from the first location of the non-volatile memory and via an auxiliary processor structurally identical to the first processor and configured to decrypt the second key using the first key; and
activate the second processor with the second key in clear form.

16. An integrated circuit card, comprising:
a component, comprising:
- a first memory comprising a first partition encrypted with a first key, and a second partition encrypted with a second key, the second key different from the first key;
- a storage register configured to store the first key, the first partition comprising booting instructions to be executed in response to the component being powered up, the second partition comprising protected user data;
- a non-volatile memory different from the first memory and the storage register and comprising a first partition and a second partition, the second partition encrypted with a third key different from the first key and the second key, wherein:
  - the second key is stored in a first location of the first partition of the non-volatile memory;
  - a memory address of the first location is stored in the first partition of the first memory; and
  - the third key is stored in the second partition of the first memory; and
- a processor configured to decrypt the first partition of the first memory using the first key, decrypt the second partition of the first memory using the second key, and decrypt the second partition of the non-volatile memory using the third key.

17. The integrated circuit card of claim 16, wherein:
the first key comprises a first scrambling key and the first partition of the first memory is scrambled with the first scrambling key;
the second key comprises a second scrambling key and the second partition of the first memory is scrambled with the second scrambling key;
the third key comprises a third scrambling key and the second partition of the non-volatile memory is scrambled with the third scrambling key; and the processor is configured to descramble the first partition of the first memory using the first scrambling key, descramble the second partition of the first memory using the second scrambling key, and descramble the second partition of the non-volatile memory using the third scrambling key.

18. The integrated circuit card of claim 16, wherein:
the first key comprises a first encryption key and a first scrambling key, and the first partition of the first memory is encrypted with the first encryption key and scrambled with the first scrambling key;
the second key comprises a second encryption key and a second scrambling key, and the second partition of the first memory is encrypted with the second encryption key and scrambled with the second scrambling key;
the third key comprises a third encryption key and a third scrambling key, and the second partition of the non-volatile memory is encrypted with the third encryption key and scrambled with the third scrambling key; and
the processor is configured to descramble and decrypt the first partition of the first memory using the first scrambling key and the first encryption key, descramble and decrypt the second partition of the first memory using the second scrambling key and the second encryption key, and descramble and decrypt the second partition of the non-volatile memory using the third scrambling key and the third encryption key.

19. The integrated circuit card of claim 16, wherein the non-volatile memory is selected from the group consisting of a memory of an electrically programmable and erasable type, and FLASH memory.

20. The integrated circuit card of claim 16, wherein a value of the first key is configured to reset the storage register.

* * * * *